Jan. 9, 1968     H. B. MARTIN     3,363,050
WIRING DUCT WITH HERMAPHRODITIC CONNECTING ELEMENTS
Filed Dec. 9, 1965     2 Sheets-Sheet 1

INVENTOR.
HAROLD B. MARTIN
BY John Babis Jr.
ATTORNEY.

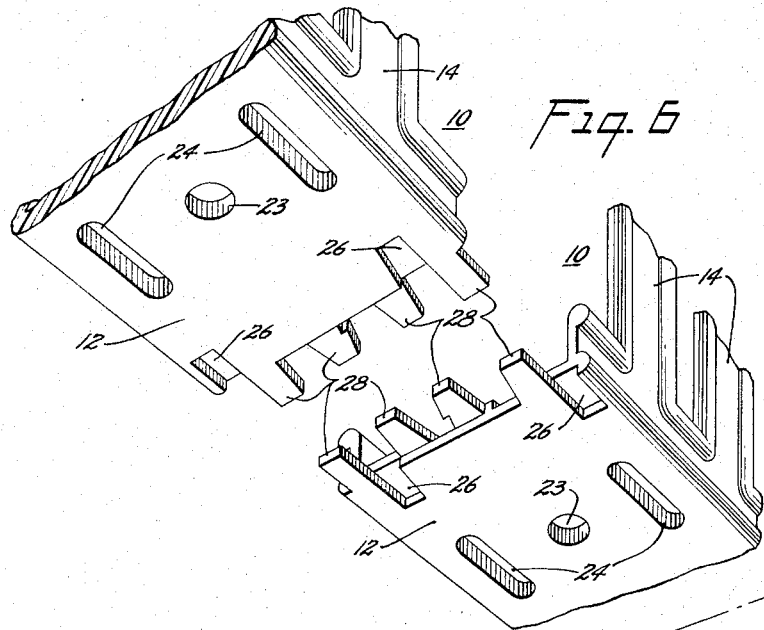
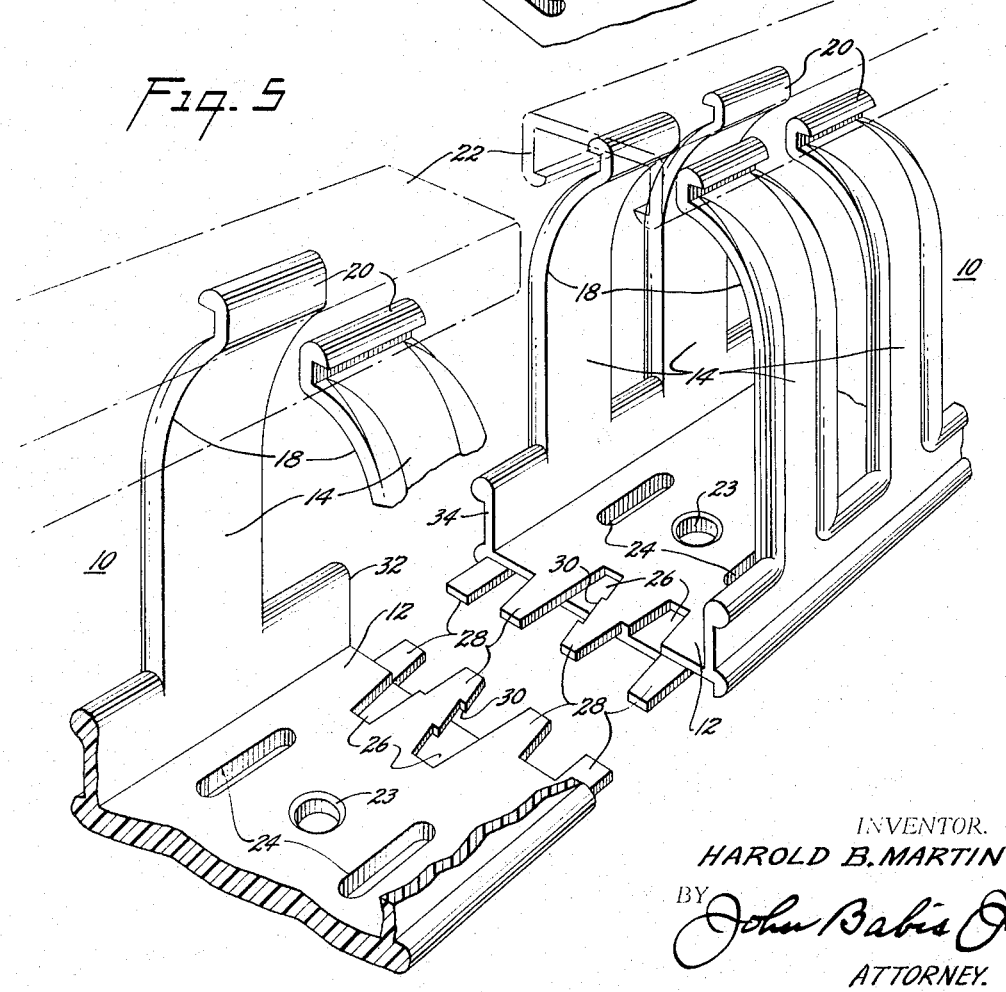

United States Patent Office 3,363,050
Patented Jan. 9, 1968

3,363,050
WIRING DUCT WITH HERMAPHRODITIC
CONNECTING ELEMENTS
Harold B. Martin, Roselle, N.J., assignor to The Thomas & Betts Co., Elizabeth, N.J., a corporation of New Jersey
Filed Dec. 9, 1965, Ser. No. 513,674
7 Claims. (Cl. 174—101)

The present invention relates to conduits for insulated electrical conductors and more specifically to wiring ducts provided with integral hermaphroditic connecting elements at the opposite ends of each duct section adapted to be joined in complementary relation linearly for the reception of electrical conductors therein, said ducts including a cover or closure strip adapted to have yieldable, snap-action, bridging engagement with the spaced terminal ends of the opposite sides of said ducts.

Accordingly, it is an object of the invention to provide wiring duct sections of predetermined size and length which may be assembled in linear and/or angular relation with facility and dispatch.

A further object of the invention is to provide a wiring duct of predetermined length which precludes waste in assembling a "run" thereof because the novel coupling elements integral with its opposite ends permits the use of a portion of a wiring duct, as in a corner, the cut end of said portion being mitered, for example to abut a similar end portion.

A further object of the invention is to provide wiring duct sections which provide for wiring "break-outs" or branches laterally thereof while protecting the insulated wiring against abrasion or damage by reason of the rounded margins of said sections.

Another object of the invention is to provide wiring duct sections of the character described which require only a minimum of a retention or supporting means for securing an assembled run thereof on a fixed surface.

With the above and other objects in view, the invention resides in the novel coupling element construction, combination, and arrangement of elements, the novel features of which are set forth with particularity in the appended claims, the invention itself, however, both as to its organization and operation, together with additional objects and advantages thereof, being best understood from the following description of a specific embodiment thereof, when taken in connection with the accompanying drawings in which:

FIGURE 5 is a fragmentary perspective view of one end of each of a pair of wiring duct sections in spaced end to end relation showing the hermaphroditic connecting elements integral therewith, as seen from the outer or top side of said sections; and FIGURE 6 is a similar fragmentary perspective view of one end of each of a pair of wiring duct sections in spaced end to end relation showing the hermaphroditic connecting elements as seen from the underside thereof.

Figure 1:
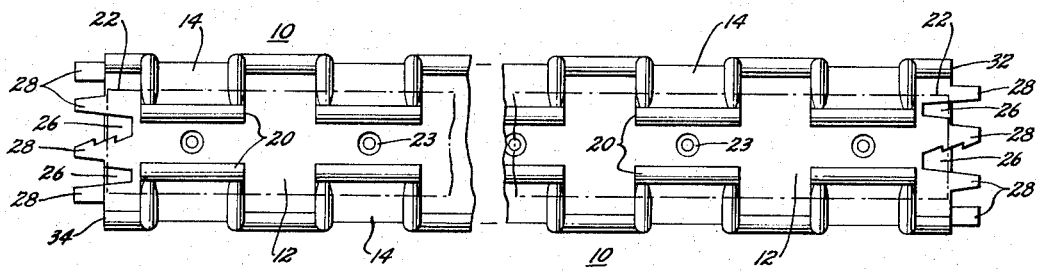
FIGURE 1 is a top plan view in elevation of a length of wiring duct with its opposite end portions formed to present hermaphroditic connecting elements integral therewith.
Figure 2:
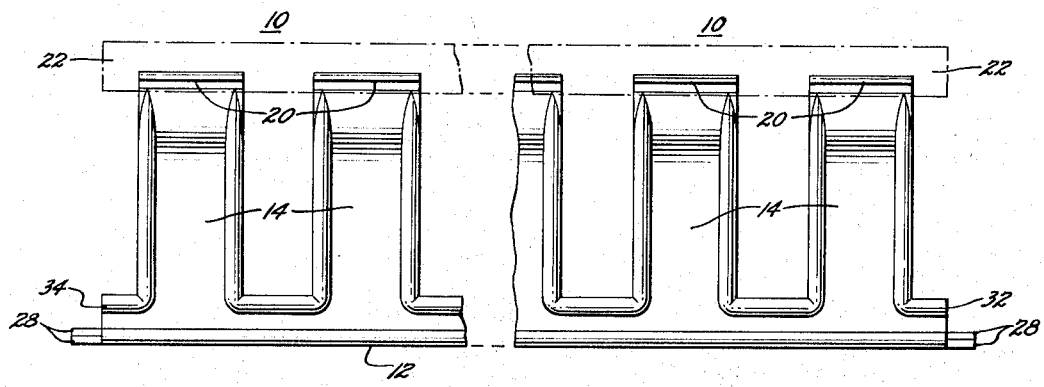
FIGURE 2 is a side elevation of the same.
Figure 3:
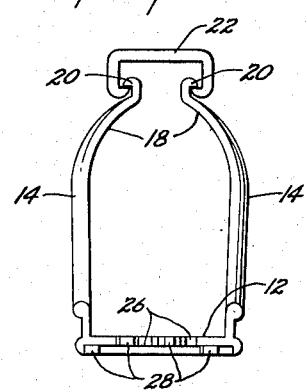
FIGURE 3 is an end view in elevation of FIGURE 2.

Referring to the drawing FIGURES 1 through 3 show a wiring duct section 10, molded of approved plastic, for example, having a U-shape configuration in cross-section presenting a flat bottom or floor 12 with the legs 14 thereof in the form of spaced, parallel rows of tines 16 having rounded edges in cross-section with the free end portions of each row thereof curved inwardly to form a wire retaining arch 18, the tines in each row being connected in pairs at their free ends by an inverted hook-like integral end portion 20 disposed normal thereto in spaced alignment adapted to receive a complementary closure strip 22 thereon in yieldable snap-action engagement with the hooked end of said tines.

Further in accordance with the invention, the floor 12 of each wiring duct section 10 is provided with countersunk openings 23 for the reception of flat head mounting screws, not shown, and one or more elongated slots 24 between said openings 23 whereby each duct section 10 is adapted to be shifted endwise relative to a fixed mounting surface or other support.

As best shown in FIGURES 5 and 6 the base or floor 12 of each duct section 10, at its opposite ends is provided, as by molding, with a plurality of cavities 26 and complementary projections 28 respectively in or on said opposite end base or floor portion which occupy different planes in transverse parallelism, one of the projections 28 at each of said opposite ends presenting a plurality of small saw-teeth 30 along one edge face thereof whereby when the duct section end portions 32 and 34, shown in FIGURE 5 are brought together, the cavities 26 and projections 28 will be inter-related, including the saw-teeth 30, into a close fitting relationship and at the same time prevent relative movement between the connected sections either laterally or endwise.

Figure 4:
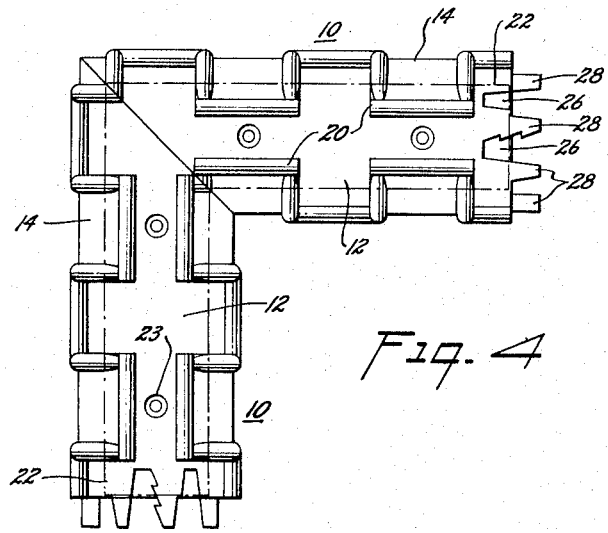
FIGURE 4 is a fragmentary plan view showing the manner in which linear runs of wiring duct sections are connected in angular end to end relation.

From the foregoing description it will be clear that the invention residing in the hermaphroditic coupling or connecting elements 26 and 28 molded in or on the opposite end portions of each duct section 10 makes it possible to secure many such sections in perfect alignment and in secure relation against relative lateral or endwise shift therebetween. Moreover, the provision of hermaphroditic coupling or connecting elements 26 and 28, for example, on the opposite end portions of wiring duct sections 10, as described, precludes waste of portions of such sections since the smallest pieces of such sections, left over from a previous assembly, are utilizable in the corners of angular assemblies as best shown in FIGURE 4 where one severed end of a partial duct section 10 is mitered for angular abutment with a similarly mitered piece of duct section 10, the hermaphroditic coupling elements 26 and 28 on the opposite end of such severed end pieces of full length duct sections 10 make the use thereof in the assembly of a "run" thereof not only possible but highly economical.

While the duct sections 10 have been described as molded of a suitable plastic material, it is to be expressly understood that the duct sections 10 may also be fabricated of suitable sheet metal wherein the hermaphroditic elements 26 and 28 are die-formed and struck out of the plane of the metal into parallel planes or, the duct sections 10 may be stamped from thin metal and two or more stampings assembled in super imposed or laminated relation and spot welded together after each of such stampings has had either the elements 26 or the projections 28 formed therein or thereon whereby they will, when assembled, be disposed in different parallel planes.

While the invention has been illustrated and described with respect to one embodiment thereof, it is to be understood that various changes and modifications may be made therein without departing from the inventive concept underlying the same. Therefore, the invention is not to be limited except as is necessitated by the prior art and the scope of the appended claims.

What is claimed is:

1. A wiring duct comprising an elongated member of substantially U-shape in cross-section wherein the opposite ends of the base portion of said elongated member each present integral therewith hermaphroditic connecting elements in transverse parallel planes whereby a plurality of elongated members are adapted to be interconnected in precise end to end alignment.

2. A molded wiring duct comprising an elongated member having a substantially U-shape configuration in cross section wherein the opposite free ends of the base portion of said elongated member each present hermaphroditic connecting elements whereby a plurality of elongated members are adapted to be interconnected in precise alignment and held against relative lateral and end-wise movement.

3. A wiring duct of molded plastic material comprising an elongated member having a substantially U-shape configuration in cross-section wherein the opposite ends of the base portion of said elongated member extend slightly beyond the legs of said U-shape member and present hermaphroditic connecting elements in complementary relation in and on the top side and underside thereof.

4. A wiring duct of molded plastic material comprising an elongated member having a substantially U-shape configuration in cross-section wherein the opposite free ends of the base portion of said elongated member each present hermaphroditic connecting elements in complementary relation in and on the top side and underside of said opposite free ends.

5. A wiring duct comprising an elongated member of substantially U-shape in cross-section wherein the opposite ends of the base portion of said U-shaped member each present integral, hermaphroditic connecting elements transversely thereof in parallel planes, said hermaphroditic elements including a complementary locking means whereby a plurality of said elongated members are adapted to be interconnected in precise alignment and against relative lateral and end-wise movement.

6. A wiring duct for the reception of electrical conductors comprising an elongated member molded of insulation material and having a U-shape configuration in cross section, the legs of said U-shape member being constituted by a plurality of rows of spaced interconnected pairs of tines curved toward each other adjacent their free end to form a conductor retaining arch therebetween, each pair of said tines in each row terminating at their free end in an inverted hook-like member for the reception of a flat complementary closure strip thereon in snap-action engagement with said hook-like members, wherein the opposite free ends of the base of said U-shaped member are provided with integral hermaphroditic cavities and projections in transverse parallel planes whereby a plurality of wiring ducts may be interconnected in precise alignment.

7. A wiring duct for the reception of electrical conductors comprising an elongated member molded of insulation material and having a U-shape configuration in cross section, the legs of said U-shape member being constituted by a plurality of rows of spaced interconnected pairs of tines curved toward each other adjacent their free end to form a conductor retaining arch therebetween, each pair of said tines in each row terminating at their free end in an inverted hook-like member for the reception of a flat complementary closure strip thereon in snap-action engagement with said hook-like members, wherein the opposite free ends of the base of said U-shaped member are provided with integral hermaphroditic cavities and projections in transverse parallel planes whereby a plurality of wiring ducts may be interconnected in precise alignment, said hermaphroditic projections being provided with complementary saw-teeth along one edge face thereof whereby said connected wiring ducts are locked against relative end-wise movement.

No references cited.

DARRELL L. CLAY, *Primary Examiner.*